US009596743B2

(12) United States Patent
Enzmann

(10) Patent No.: US 9,596,743 B2
(45) Date of Patent: Mar. 14, 2017

(54) BEAM GUIDING APPARATUS

(71) Applicant: TRUMPF Lasersystems for Semiconductor Manufacturing GmbH, Ditzingen (DE)

(72) Inventor: Andreas Enzmann, Villingen-Schwenningen (DE)

(73) Assignee: TRUMPF Lasersystems for Semiconductor Manufacturing GmbH, Ditzingen (DE)

( * ) Notice: Subject to any disclaimer, the term of this patent is extended or adjusted under 35 U.S.C. 154(b) by 0 days.

(21) Appl. No.: 15/067,691

(22) Filed: Mar. 11, 2016

(65) Prior Publication Data

US 2016/0198557 A1 Jul. 7, 2016

Related U.S. Application Data

(63) Continuation of application No. PCT/EP2013/068939, filed on Sep. 12, 2013.

(51) Int. Cl.
*H05G 2/00* (2006.01)
*G02B 1/11* (2015.01)
(Continued)

(52) U.S. Cl.
CPC ............. *H05G 2/008* (2013.01); *G02B 1/11* (2013.01); *G02B 7/08* (2013.01); *G02B 13/146* (2013.01);
(Continued)

(58) Field of Classification Search
CPC .......... H05G 2/008; H05G 2/005; G02B 1/11; G02B 27/1006; G02B 27/142; G02B 13/146; G02B 7/08; H05H 7/14
(Continued)

(56) References Cited

U.S. PATENT DOCUMENTS

2010/0078577 A1* 4/2010 Moriya .................. H05G 2/005
250/504 R
2011/0140008 A1 6/2011 Bergstedt et al.
(Continued)

FOREIGN PATENT DOCUMENTS

EP       2182412 A1    5/2010
WO   WO2011162903 A1  12/2011
(Continued)

OTHER PUBLICATIONS

Notification of Transmittal of Translation of the International Preliminary report on Patentability and the Written Opinion of the International Search Authority for corresponding PCT Application No. PCT/EP2013/068939, issued Mar. 15, 2016, 16 pages.
(Continued)

*Primary Examiner* — Michael Maskell
(74) *Attorney, Agent, or Firm* — Fish & Richardson P.C.

(57) ABSTRACT

A beam guiding apparatus includes a vacuum chamber that includes a target region arranged to receive a target material for generating EUV radiation. The vacuum chamber includes a first and second opening for receiving into the vacuum chamber a first and second laser beam, respectively. The first and second laser beam have different wavelengths. The beam guiding apparatus further includes a superposition apparatus arranged to superpose the first and second laser beams entering into the vacuum chamber through the first and second openings, respectively, for common beam guidance in the direction of the target region. The superposition apparatus comprises a first optical element configured to seal the first opening of the vacuum chamber in a gas-tight manner and transmit the first laser beam, or a second optical element configured to seal off the second opening of the vacuum chamber in a gas-tight manner and transmit the second laser beam.

19 Claims, 3 Drawing Sheets

(51) Int. Cl.
   *G02B 7/08*      (2006.01)
   *G02B 13/14*     (2006.01)
   *G02B 27/10*     (2006.01)
   *G02B 27/14*     (2006.01)
   *H05H 7/14*      (2006.01)
   *H01S 3/23*      (2006.01)
   *H01S 3/00*      (2006.01)

(52) U.S. Cl.
   CPC ....... *G02B 27/1006* (2013.01); *G02B 27/142* (2013.01); *H05G 2/005* (2013.01); *H05H 7/14* (2013.01); *H01S 3/005* (2013.01); *H01S 3/2391* (2013.01)

(58) Field of Classification Search
   USPC ...................................................... 250/504 R
   See application file for complete search history.

(56) References Cited

U.S. PATENT DOCUMENTS

2013/0026393 A1    1/2013  Abe et al.
2013/0153794 A1*   6/2013  Wakabayashi ......... H05G 2/008
                                                250/504 R

FOREIGN PATENT DOCUMENTS

WO    WO2012069898 A1    5/2012
WO    WO2012073087 A1    6/2012

OTHER PUBLICATIONS

International Search Report for corresponding PCT Application No. PCT/EP2013/068939, mailed May 27, 2014, 4 pages.

* cited by examiner

BEAM GUIDING APPARATUS

CROSS-REFERENCE TO RELATED APPLICATION

This application is a continuation of and claims priority under 35 U.S.C. §120 to PCT Application No. PCT/EP2013/068939 filed on Sep. 12, 2013. The contents of this priority application is hereby incorporated by reference in its entirety.

TECHNICAL FIELD

The present disclosure relates to a beam guiding apparatus.

BACKGROUND

A beam guiding apparatus for an extreme ultraviolet radiation (EUV) radiation generating device has been disclosed in, for example, US 2011/0140008 A1. The beam guiding apparatus described therein serves for guiding laser radiation which was generated and amplified in a beam source, for example, in a driver laser system. The beam guiding apparatus guides the laser beam from the driver laser system to a focusing apparatus in order to focus the laser beam in a target region. A target material which is converted into a plasma state when irradiated by the laser beam and which emits EUV radiation in the process is provided in the target region. The target material is typically provided in a vacuum chamber, into which the laser beam enters by way of an opening.

In general, some of the target material (e.g., tin) evaporates when irradiated by the laser beam and deposits on the optical surfaces of optical elements arranged in the vicinity of the target region. In order to counteract this problem, a $CO_2$ laser is generally used as a laser source or as a driver laser. As a result of the long wavelength (for example, approximately 10.6 μm), $CO_2$ radiation is also reflected by optical elements that have a comparatively rough optical surface, as caused by, e.g., tin deposits. The use of a laser source or a driver laser in the form of a $CO_2$ can lead to high conversion efficiency between the input power of the driver laser and the output power of the generated EUV radiation in the case of specific target materials such as, e.g., tin.

WO 2011/162903 discloses a driver laser arrangement that has a first seed laser for generating a pre-pulse and a second seed laser for generating a main pulse. The pre-pulse and the main pulse have different wavelengths and they are combined by a beam combiner in order to pass along a common beam path through an amplifier and the beam guiding apparatus following the driver laser arrangement. The pre-pulse can, for example, influence the target material. For example, the pre-pulse can heat up, expand, vaporize, and/or ionize the target material to generate a weak, or possibly a strong, plasma. The main pulse can, for example, convert the majority of the material influenced by the pre-pulse into the plasma state and generate EUV radiation in the process.

Both the pre-pulse and the main pulse are guided into the vacuum chamber through a common opening. Since the pressure inside the vacuum chamber is typically lower than the pressure in the beam guidance outside of the vacuum chamber, it is generally required to seal this opening in a gas-tight manner from the surroundings by a transmissive optical element which, for example, may form a window, e.g., a plane plate. The transmissive optical element should enable a passage for both laser beams (pre-pulse and main pulse) with small losses and/or aberrations. If the wavelength of the pre-pulse differs significantly from the wavelength of the main pulse, the transmissive optical element can lead to losses and aberrations in pre-pulse or main pulse or both.

SUMMARY

The present disclosure relates to improving the functionality of a beam guiding apparatus and an EUV radiation generating device that are configured to guide two laser beams with (significantly) different wavelengths.

In general, in a first aspect, the subject matter of the present disclosure can be embodied in a beam guiding apparatus, that includes: a vacuum chamber, in which a target material is introducible into a target region for generating EUV radiation. The vacuum chamber has a first opening for the entry of a first laser beam and a second opening for the entry of a second laser beam, in which the first laser beam and the second laser beam have different wavelengths. The beam guiding apparatus also includes a superposition apparatus for superposing the two laser beams entering into the vacuum chamber through the first and second openings for common beam guidance in the direction of the target region.

The first and second laser beams do not enter into the vacuum chamber through a common opening with a common window but rather use two different openings. In this way, a first transmissive material optimized for a particular wavelength of the first or second laser beam, can be used as the transmissive optical element, which seals the respective opening in a gas-tight manner. Initially, separate beam paths of the two laser beams emerge in the vacuum chamber as a result of the entry of the two laser beams through different openings. For the purpose of combining the two beam paths, a superposition apparatus is provided, in which the superposition apparatus combines and superposes the two laser beams entering through the different openings.

By contrast, a consequence of the separate beam guidance of the two laser beams in the vacuum chamber would be that dynamic excitations caused by vibrations, thermally induced displacements, among other effects on the optical elements arranged in the vacuum chamber would have different effects on both of the laser beams, which would lead to different lengths of the beam paths or different fluctuations in the lengths of the beam paths of the two laser beams in relation to the respective focal position and hence to a change in the relative distance between the focal positions of the two laser beams in the target region. However, the relative distance between the two focal positions should be maintained precisely; this can be ensured by the common beam guidance of the two laser beams, in particular when these are focused or passed through a common focusing unit, since the errors in the beam guidance have the same effect on the laser beams that are guided together.

The foregoing and other implementations can optionally include one or more of the following features, individually or in combination. For example, in some implementations, an optical element that closes off the first opening of the vacuum chamber in a gas-tight manner and transmits the first laser beam or an optical element that closes off the second opening of the vacuum chamber in a gas-tight manner and transmits the second laser beam is configured as a superposition apparatus. In this case, the common or superposed beam guidance starts directly from entry of the first or second laser beam into the vacuum chamber at the first or second opening. In addition to the transmitting function thereof, the optical elements at the first and second openings can also satisfy other optical functions, such as, e.g., a collimating or focusing function for the laser beams passing therethrough.

In some implementations, the transmitting optical element is a window that closes off the vacuum chamber in a gas-tight manner. The window can be configured as a plane-parallel plate that forms an aperture in the wall of the vacuum chamber for the passage of a respective laser beam. The window separates the interior of the vacuum chamber from the interior of a second vacuum chamber with a different, typically significantly larger pressure than the pressure in the other vacuum chamber. The transmitting optical element configured as a window does not have a beam shaping function.

In some implementations, the optical element that transmits the second laser beam has, at the optical surface thereof arranged in the vacuum chamber, a coating that reflects the first laser beam, or vice versa. In this case, the first laser beam is reflected at the reflecting coating while the coating is configured to be transmissive for the second laser beam. In the case of a suitable alignment of the first laser beam with respect to the optical surface with the reflecting coating, the beam path of the two laser beams can be superposed, e.g., the laser beams extend in a parallel or collinear manner after the superposition. A superposition can also be realized in the opposite way. In this case, the second laser beam, for the purposes of superposition with the first laser beam, is incident on the optical surface, situated in the vacuum chamber, of the optical element transmitting the first laser beam, at which optical surface a coating reflecting the second laser beam has been applied.

In some implementations, the transmitting optical element is aligned at an angle (differing from 90°) with respect to the beam direction of the first or second laser beam transmitted by the optical element. Such an arrangement at an angle with respect to the beam direction can be advantageous, particularly in the case of an optical element in the form of a window, since the latter does not have an optical effect, or has a negligible optical effect, on the transmitted laser beam even in the case of non-perpendicular incidence. Arranging the transmitting optical element at an angle with respect to the beam direction of the transmitted laser beam, such as at an angle between approximately 30° and approximately 70°, renders it possible to radiate the respective other, not transmitted laser beam onto the transmitting optical element with a comparatively large angle of approximately 90° with respect to the beam direction of the transmitted laser beam, which simplifies the superposition of the two laser beams. The alignment at an angle differing from 90° with respect to the beam direction can also be advantageous for using laser radiation reflected back at the transmitting optical element for measurement purposes.

In some implementations, a deflection apparatus for deflecting the first or second laser beam onto the transmitting optical element, which forms the superposition apparatus, is arranged in the vacuum chamber. With the deflection apparatus, it is possible to fold or deflect the first or second laser beam entering into the vacuum chamber in such a way that it is incident on the transmitting optical element, more precisely on the optical surface, with a reflecting coating, of the transmitting optical element, and reflected at the latter. For example, the deflection apparatus can be formed by one or more deflection mirrors which can optionally be adjusted in terms of their alignment.

In some implementations, a common focusing apparatus for focusing the two laser beams into the target region is arranged in the vacuum chamber in the beam path downstream of the superposition apparatus. As a result of the common focusing apparatus, the two laser beams are focused in the target region in such a way that a target material in the target region is influenced by the focused laser beams, e.g., converted into a plasma state, and EUV radiation can be generated in the process. The common focusing apparatus can, for example, include a beam-expanding optical element, e.g., a paraboloid mirror, and a subsequent focusing optical element, e.g., an ellipsoid mirror, which are both arranged in the vacuum chamber. The focusing unit can also have a transmissive configuration and, for example, have a lens. Thermally dependent displacements and possibly occurring dynamic excitations of the two mirrors arranged downstream of the superposition apparatus therefore have the same effect on both laser beams. What this can ensure is that there is not an unwanted change in the relative distance between the focal positions of the two laser beams in the target region.

In some implementations, the beam guiding apparatus includes a focusing apparatus, arranged upstream of the superposition apparatus in the beam path of the first or second laser beam, for focusing the first or second laser beam in the direction of the target region. With the aid of such a focusing apparatus, which only influences the beam path of one of the two laser beams (typically in the beam path upstream of the vacuum chamber), focusing of the first or second laser beam by a constant or optionally variable amount in the direction of propagation can be undertaken, without influencing the focal position of the other laser beam. In this manner, the distance between the focal positions of the two laser beams in the target region can be modified, to be precise, typically, along a direction extending substantially perpendicular to a movement direction of the target material. The movement of the target material can be along a straight-lined or substantially straight-lined trajectory, e.g., with a (substantially) constant movement direction. The movement direction can correspond to, for example, the direction of the gravitational force or a different direction, e.g., a horizontal direction. Strictly speaking, the trajectory corresponds in the latter case to a projectile parabola proceeding from the emergence of the target material from a provision apparatus; however, the projection parabola, to a good approximation, can be considered to be a straight-lined trajectory due to the high speed of the emerging target material.

In some implementations, the focusing apparatus is configured to compensate a beam expansion of the first or second laser beam reflected at the reflecting coating of the window and caused by the curvature of the transmitting optical element. As an example, the curvature of the transmitting optical element, which can be configured as a window, can be caused by differences in the pressures acting on opposite sides of the window, in which the window typically arches into the vacuum chamber due to the greater pressure prevailing outside of the vacuum chamber, and so the optical surface with the reflecting coating has a convex curvature bringing about a beam expansion of the respectively reflected laser beam. As a result of the preceding focusing, the beam expansion or divergence of the respective reflected laser beam can advantageously be compensated, and so the latter is collimated before it is incident on the common focusing unit with the other laser beam. The focusing apparatus, for example in the form of a lens, can have a stationary arrangement and assume a focal length or position in the convergent or divergent beam path of the respective laser beam suitable for compensating the expected beam expansion due to the curvature of the window occurring during the operation of the beam guiding apparatus.

In some implementations, the focusing apparatus is configured to change a focal position of the first or second laser beam in the beam direction of the first or second laser beam. In this way, the focal position of the first and/or second laser beam(s) can be displaced by a variable amount along the propagation direction of the laser beams. The variable focusing can be employed to modify the focal position of the respective laser beam independently of the focal position of the other laser beam in a direction perpendicular to the movement direction of the target material in order to act on the target material at a suitable location.

Alternatively or additionally, the beam expansion of the reflected first or second laser beam, generated by the curvature or a change in the curvature of the transmitting optical element configured as a window, can be compensated in a variable manner. When there is a change in the focal position of the respective laser beam, which can be traced back to a change in the curvature of the window, it is possible to act on the focusing apparatus in such a way that the latter causes a change in the focal position which counteracts a change in the focal position caused by a change in the curvature and which ideally just compensates this change. In this manner, a collimated laser beam or a convergent or divergent laser beam can be generated downstream of the superposition apparatus. An open-loop/closed-loop control apparatus can be provided in the beam guiding apparatus for up-to-date compensation of changing curvatures of the window.

In some implementations, the beam guiding apparatus additionally includes a measurement apparatus for measuring a curvature of the transmitting optical element configured as a window. An instantaneous curvature of the window can be determined or established by the measurement apparatus. The curvature can be established in an real-time manner and therefore detect instantaneous changes in the curvature of the window and hence changes in the beam expansion. The information supplied by the measurement apparatus can be used by the above-described open-loop/closed-loop control apparatus in order to equalize or compensate changes in the focal position of the respective laser beam caused by the change in the curvature.

In some implementations, the measurement apparatus is configured to determine a pressure inside the vacuum chamber and a pressure outside of the vacuum chamber. By way of the pressure measurement, which e.g., can be implemented with the aid of two pressure sensors, it is possible to determine a parameter dependent on the two measured pressures, the parameter forming a measure for the curvature of the reflecting optical surface. For example, the parameter can be the difference of the measured pressures, the quotient of the measured pressures, among other measures. If the pressure outside of the vacuum chamber has a known value, e.g., if it corresponds to the ambient pressure (atmospheric pressure), it may be possible to dispense with the provision of a pressure sensor outside of the vacuum chamber. The parameter or changes in the parameter can be determined by the measurement apparatus and, for example, transmitted as a signal to an open-loop/closed-loop control apparatus in order to be able to undertake closed-loop control of the focal position. Alternatively, the curvature of the optical element can also be measured directly, in particular with the aid of an optical measurement, for example in the way of an autocollimator. In the latter case, a collimated measurement beam is directed onto the optical element, said measurement beam being reflected back onto itself at the reflecting surface (or possibly at the optical surface situated outside of the vacuum chamber). With the aid of a beam splitter, it is possible to image and evaluate both the reflection of the measurement beam and the emitted measurement beam on a detector surface of a spatially resolving detector, e.g., a camera. If the surface reflecting the measurement beam is planar (f=infinity), both the measurement beam and the reflection have the same diameter on the detector surface. If the reflecting surface arches concavely, the reflection is focused and imaged as a smaller beam spot on the camera image. If the surface arches convexly, the reflection is expanded and imaged as a larger beam spot on the camera image. The focal length or the curvature of the optical element can be deduced (by simulation or experiments) from the ratio between the diameter of the measurement beam and the diameter of the reflection.

In some implementations, the transmitting optical element has an antireflection coating for the transmitted first or second laser beam at a surface facing away from the vacuum chamber and/or at a surface arranged in the vacuum chamber. In this way, there are no, or hardly any, reflections at the surfaces of the transmitting optical element, and so the laser beams are transmitted completely or virtually completely. Losses and scattering are therefore reduced in an advantageous manner or, ideally, completely avoided.

In some implementations, the beam guiding apparatus includes a focus adjustment apparatus for adjusting the focal position of the first or second laser beam along a movement direction of the target material. With the aid of the focus adjustment apparatus, it is possible to adjust the focal position of one of the laser beams along the movement direction of the target material independently of the focal position of the other laser beam, and so the distance between the two focal positions of the laser beams becomes adjustable in the target region along the movement direction of the target material.

In some implementations, the focus adjustment apparatus is configured to adjust an angle of incidence, such as an angle of incidence differing from normal incidence, of the first or second laser beam upon entry into the common focusing unit. In order to adjust the angle of incidence, the focus adjustment apparatus can include, for example, one or more tiltable deflection mirrors. Using the deflection mirrors, it is possible to adjust the direction of incidence of the first or second laser beam on the transmitting optical element, and hence the direction of the first or second laser beam upon incidence on the common focusing unit, in a targeted manner. In particular, the focus adjustment apparatus can serve to set a minor deviation from parallel incidence of the two laser beams on the first optical element of the common focusing unit.

In some implementations, the beam guiding apparatus additionally includes an open-loop and closed-loop control apparatus for regulating at least one of the focal positions of the two laser beams to a setpoint focal position. The open-loop and closed-loop control apparatus can regulate at least one focal position of one of the two laser beams to a setpoint focal position for the possibly required adaptation of the distance between the two focal positions. For closed-loop control purposes, the beam paths of the laser beams can be measured using suitable measurement apparatuses. For influencing the focal positions, the closed-loop control apparatus can be connected in a signaling manner with, for example, the focus adjustment apparatus, in particular with actuators of the focus adjustment apparatus, by which the beam directions of the laser beams can be influenced, and with actuators of the focusing apparatus, for example for displacing focusing elements provided therein, in particular lenses provided there. The open-loop and/or closed-loop control apparatus also serves to synchronize the beam sources generating the laser beams with the provision apparatus for the target material.

In some implementations, the second laser beam has a wavelength greater than 10 μm. For the purposes of generating a wavelength of more than 10 μm, a $CO_2$ laser is generally used as laser source or driver laser: on account of its long wavelength of approximately 10.6 μm, $CO_2$ laser radiation is also reflected by optical elements which have a comparatively rough optical surface, as may be caused by tin deposits which may arise when tin is used as a target material. The use of a laser source or a driver laser in the form of a $CO_2$ laser moreover enables a high conversion efficiency between the input power of the driver laser and the output power of the generated EUV radiation in the case of tin as a target material, provided the $CO_2$ laser is used for generating the main pulse.

In some implementations, the first laser beam has a wavelength less than 3.0 μm. In general, a solid-state laser, for example an Nd:YAG laser with a wavelength of 1.06 μm, which is typically operated as a short pulse laser, e.g., with pulse lengths in the nanosecond range or in the picosecond range, can be used to generate a wavelength of less than 3.0 μm. Solid-state lasers or other lasers, which generate wavelengths of less than approximately 3.0 μm, can also be used as a beam source for generating the pre-pulse. The use of laser radiation with a comparatively short wavelength can be advantageous for generating the pre-pulse since this renders it possible to realize very short pulse durations and sharper focusing of the pre-pulse in the target region.

In general, in another aspect, the subject matter of the disclosure can be embodied in an EUV radiation generating device, that includes: a first and second beam source for generating first and second laser beams, and a beam guiding apparatus as described herein. Essentially, the EUV radiation generating device makes use of the same advantages as the beam guiding apparatus described herein.

The first beam source can be, for example, a solid-state laser (optionally with suitable gain stages) serving to generate the pre-pulse, while the second beam source can be a $CO_2$ laser source (optionally with suitable gain stages) for generating the main pulse. A desired setpoint focal position of a respective laser beam can be regulated or set within the target region by the above-described open-loop and/or closed-loop control apparatus. Such closed-loop control is advantageous if interference occurs on the radiation beam side or at other optical components, e.g., at the superposition apparatus configured as a window, leading to a change in the focal position. By way of example, the closed-loop control apparatus can remove by closed-loop control or suppress interference in the form of variations in the direction or divergence of the laser beam (e.g., a drift) such that the two laser beams, or the focal positions thereof, remain at their respective setpoint focal position by readjustment.

The features mentioned above and the features yet to be explained below can be used on their own in each case or several of these can be used in any combination. The shown and described implementations should not be understood as a conclusive list but instead have an exemplary character for explaining the invention.

The details of one or more implementations of the subject matter of this disclosure are set forth in the accompanying drawings and the description below. Other features, aspects, and advantages of the subject matter will become apparent from the description, the drawings and the claims.

DETAILED DESCRIPTION

Figure 1A:
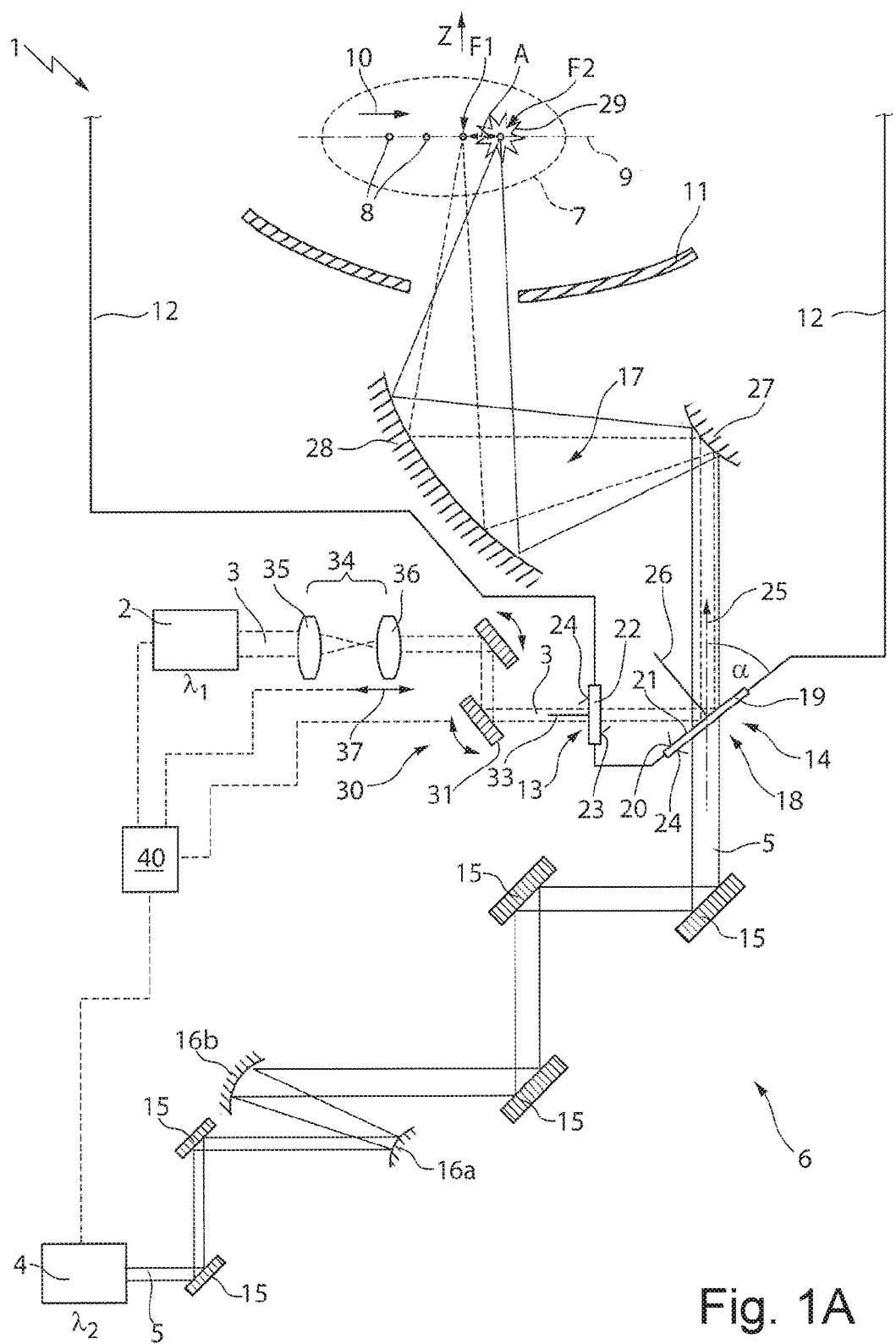
FIG. 1A is a schematic that illustrates an exemplary embodiment of an EUV radiation generating device with a superposition apparatus in the form of a window for superposing two laser beams entering into a vacuum chamber through different openings.

FIG. 1A is a schematic that illustrates an EUV radiation generating device 1 that includes a first beam source 2 (for example, a solid-state laser) that generates a first pulsed laser beam 3, and a second beam source 4 (for example, a driver laser configured as a $CO_2$ laser) that generates a second pulsed laser beam 5 with high radiation power (e.g., >>1 kW). The second beam source 4 can include multiple amplifiers that allow the generation of the second laser beam 5 with a high beam power. In the implementation illustrated in FIG. 1A, the first laser beam 3 and the second laser beam 5 can have substantially different wavelengths $\lambda_1$, $\lambda_2$. For example, wavelengths $\lambda_1$ and $\lambda_2$ can differ by approximately one order of magnitude.

In the implementation illustrated in FIG. 1A, the first laser beam 3 has a wavelength $\lambda_1$ (for example, approximately 1.06 μm) and is generated by the solid-state laser 2 in the form of, e.g., an Nd:YAG laser configured as a disk laser. The second laser beam 5, generated by the $CO_2$ laser, has a wavelength $\lambda_2$, e.g., of approximately 10.6 μm. The EUV radiation generating device 1 further includes a beam guiding apparatus 6, by which the two laser beams 3, 5 are guided in the direction of the target region 7. A target material 8 in the form of tin droplets has been arranged in the target region 7 to generate EUV radiation 29. For reasons of clarity, the illustration of measurement apparatuses for monitoring the beam path of the laser beams 3, 5 is not shown in FIG. 1A. The target material 8, e.g., the tin droplets, is provided by a provision apparatus (not shown here) and can move along a predetermined, substantially straight-lined trajectory 9 or along a predetermined path in a movement direction 10, which extends horizontally in the shown example. Other trajectories or movement directions are also possible for the target material 8; for example, the movement direction 10 can correspond to the direction of the gravitational force.

For the purposes of generating the EUV radiation 29, the target material 8 is initially influenced, e.g., heated, expanded, vaporized, ionized and/or brought into the state of a weak or optionally strong plasma, by the first laser beam 3, which forms a pre-pulse. The second laser beam 5, which forms the main pulse and can have higher power than the pre-pulse, converts the majority of the target material 8 influenced by the first laser beam 3 into the plasma state and the EUV radiation 29 can be generated in the process. As illustrated in FIG. 1A, the first and the second laser beams 3, 5 can be configured to impinge on the target 8 (e.g., a tin droplet moving along the trajectory 9) with a predetermined time interval, by focusing the first and the second laser beams at different spatial points or at different focal positions F1 and F2, respectively, along the trajectory 9 of the target 8.

For the targeted alignment or focusing of the EUV radiation 29, the EUV radiation generating device 1 includes an EUV focusing mirror 11, such as an ellipsoid mirror. The target material 8, the EUV focusing mirror 11 and the target region 7 (which is arranged to receive the target material 8) are arranged in a vacuum chamber 12 of the beam guiding apparatus 1. The two beam sources 2, 4 that generate the first and the second laser beams 3 and 5, respectively, are arranged outside of the vacuum chamber 12, e.g., in a common housing, or in two separate housings. The two laser beams 3 and 5 are guided to the target region 7 via a first opening 13 and via a second opening 14, respectively.

The first laser beam 3 can be guided to the first opening 13 by the beam guiding apparatus 6 that includes a telescopic arrangement 34 for changing the cross section of the first laser beam 3. The telescopic arrangement can include a first focusing lens 35 and a second, collimating lens 36 downstream thereof in the beam path. Two deflection mirrors 31, 32, which deflect the first laser beam 3 to the first opening 13, are arranged in the beam path of the first laser beam 3 downstream of the telescopic arrangement 34.

The second laser beam 5 is guided from the beam source 4 to the second opening 14 by the beam guidance apparatus 6, which includes multiple deflection mirrors 15 and a pair of parabolic mirrors 16a, b. The parabolic mirrors 16a, b can change (e.g., expand) the beam cross section of the second laser beam 5.

Mounted in the region of the first opening 13 is an optical element 22 that closes off the first opening 13 of the vacuum chamber 12 in a gas-tight manner and transmits the first laser beam 3. The optical element 22 can be, e.g., a window or as a thin plane-parallel plate as shown in the example. Accordingly, in the example shown in FIG. 1A, a second optical element 19, which closes off the second opening 14 of the vacuum chamber 12 in a gas-tight manner, transmits the second laser beam 5 and is mounted on the second opening.

The first window 22 at the first opening 13 is transparent to the first laser beam 3 (e.g., at wavelengths of less than 3 μm) and can include, for example, a fused quartz material. The second window 19 at the second opening 14 is transparent to the second laser beam 5 and can include (e.g., artificially manufactured) diamond that has high thermal conductivity for effectively dissipating the heat introduced by the high laser power (e.g., >>1 kW) of the second laser beam 5. The first and the second windows 19, 22 have a first and a second antireflection coating that transmits the first and second laser beam 3, 5, respectively, at optical surface 24 facing away from the vacuum chamber 12 and at optical surfaces 20, 23 arranged in the vacuum chamber 12 for the purpose of minimizing power losses caused by reflection during the passage into the vacuum chamber 12.

The supply of the first and the second laser beams 3, 5 through separate openings 13, 14 can be advantageous because the material of the window 22 and 19 can be matched to the transmitted wavelengths $\lambda_1$, $\lambda_2$ of the first and second laser beams 3, 5, respectively. This can avoid power losses or losses in the beam quality when passing through the windows 22, 19.

The beam guiding apparatus 6 includes a superposition apparatus 18 that can combine the beam paths of the first and second laser beams 3, 5 inside the vacuum chamber 12. In the example shown in FIG. 1A, the superposition apparatus 18 includes the second window 19 that closes off the second opening 14 of the vacuum chamber 12 in a gas-tight manner. The second window 19 can have a second coating 21 at the second optical surface 20 that is arranged in the vacuum chamber 12. The second coating 21 reflects the first laser beam 3. For example, the second coating 21 can include a coating that has a reflecting effect for the wavelength $\lambda_1$ of the first laser beam 3. The second coating 21 can be selected in such a way that it has a very small/negligible effect on the second laser beam 5. With the significant difference between the wavelengths $\lambda_1$, $\lambda_2$ of the two laser beams 3, 5, such a reflecting coating 21 can be produced using techniques known in the art.

In FIG. 1A, the normal 26 on the optical surface 20 of the second window 19 is aligned at an angle α of approximately 45° with respect to the beam direction 25 of the second laser beam 5 that is transmitted by the second window 19. The laser beam 3 is also incident at an angle of 45° with respect to the normal 26 and it is deflected at the optical surface 20 by 90° such that both laser beams 3, 5 are aligned substantially parallel to one another and propagate along a common beam path. Both laser beams 3, 5 are substantially aligned (e.g., are parallel) and impinge on a common focusing apparatus 17 disposed downstream in the beam path. The focusing apparatus 17 focuses both laser beams 3, 5 into the target region 7.

The common focusing apparatus 17 includes a paraboloid mirror 27, which forms a convex off axis segment of a paraboloid and serves for beam expansion, and an ellipsoid mirror 28, which forms a concave off axis segment of an ellipsoid and serves to focus the two expanded laser beams 3, 5 in the target region 7. If the first and the second laser beams 3, 5 are incident in a parallel and coaxial manner on the convexly curved paraboloid mirror 27, the first and the second laser beams are focused at a common focal position in the target region 7. However, it may be desirable for the laser beams 3, 5 emerging from the common focusing apparatus 17 to be focused at different focal positions F1, F2, arranged at a predetermined distance A from one another, within the target region 7. A time offset between the incidence of the first and the second pulsed laser beams 3, 5 on a given tin droplet can be realized in this manner.

The tin droplet, which is impinged upon by a pulse (pre-pulse) of the first laser beam 3 at the first focal position F1 can be subsequently impinged upon by a pulse (main pulse) of the second laser beam 5 at the second focal position F2. This can be achieved, e.g., by selecting a distance A between the two focal positions F1, F2 along the direction of the trajectory 10 of the tin droplets such that the time-of-flight of a tin droplet 8 between the two focal positions F1, F2 corresponds to the time offset between the two laser pulses 3, 5. In order to impinge upon all or most tin droplets 8 in the manner described above, the distance between two adjacent tin droplets should also be an integer multiple of the distance A between the two focal positions F1, F2 in the direction of the trajectory 10 of the tin droplets 8.

The distance A between the two focal positions F1, F2 can be adjusted by a focus adjustment apparatus 30. The focus adjustment apparatus 30 can influence the beam direction of the first laser beam 3. The focus adjustment apparatus 30 includes two deflection mirrors 31, 32, that can be tilted by, e.g., actuators. The actuators can deflect mirrors 31, 32 and render it possible to vary or adjust the beam direction of the first laser beam 3 and the position, at which the first laser beam 3 is incident on the second window 19 at the reflecting coating 21.

Figure 1B:
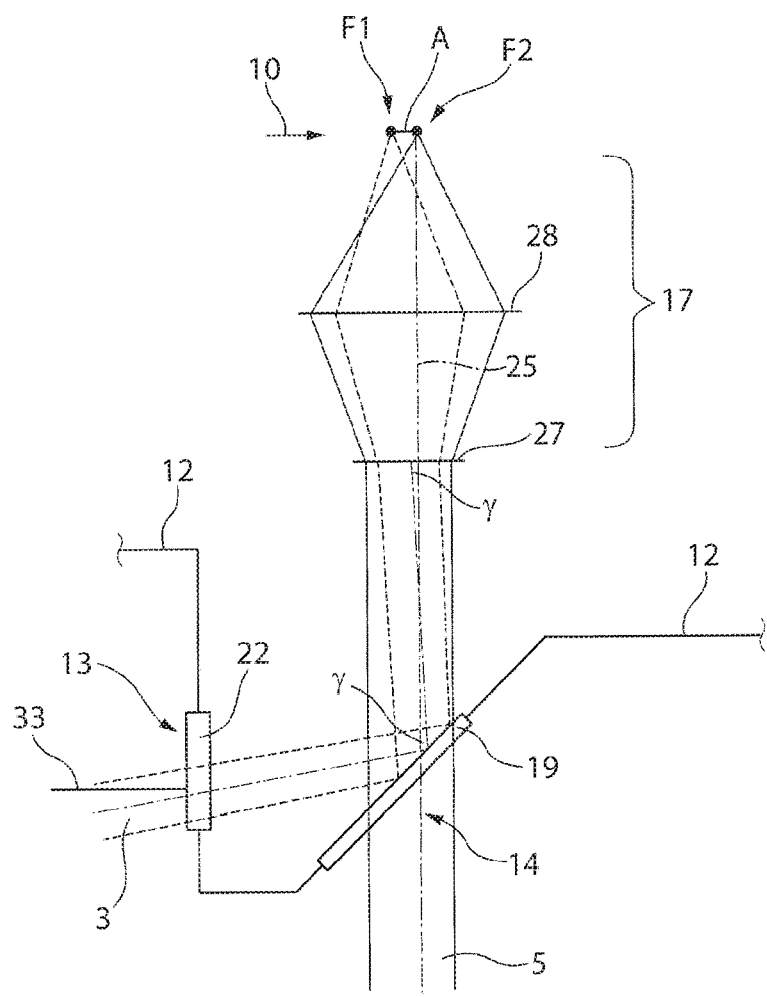
FIG. 1B is a schematic that illustrates a detailed view of a beam path in the vacuum chamber of the EUV radiation generating device of FIG. 1A.

The first laser beam 3 can be focused at the focal position F1 depicted in FIG. 1A by aligning the beam 3 along a direction extending at a slight angle with respect to the direction of the normal 33 of the first window 22. Alignment can be achieved, for example, by the focus adjustment apparatus 30 such that the first laser beam 3, after the reflecting at the optical surface 20 of the second window 19, enters into the common focusing unit 17 at a typically very small angle of incidence γ (generally no more than approximately 10 mrad) with respect to the beam axis 25 of the second laser beam 5. This is illustrated in FIG. 1B. In FIG. 1B, the common focusing unit 17 is illustrated by horizontal lines, which represent the mirror positions at which the laser beams 3, 5 are expanded by the paraboloid mirror 27 and focused by the ellipsoid mirror 28.

As a result of the oblique incidence of the first laser beam 3 on the common focusing unit 17 due to the deflection mirrors 31, 32 (cf. FIG. 1A), the first laser beam 3 is focused at a focal position F1 that is spaced apart from the focal position F2 of the second laser beam 5. The second laser beam 5 that is incident on the parabolic mirror 27 is parallel to the beam direction 25 and displaced by distance A with respect to the beam direction. The focal position F1 of the first laser beam 3 can be changed along the movement direction 10 of the target material 8 by tilting the deflection mirrors 31, 32 about respectively suitable tilt angles. It is also possible to adjust the distance A between the two focal positions F1, F2 along the movement direction 10 of the target material. By suitably tilting the deflection mirrors 31, 32 the beam offset can be varied. The region of incidence of the first laser beam 3 on the second window 19 can be varied such that the first laser beam 3 is incident concentrically with the second laser beam 4 on the parabolic mirror 27.

Alternatively or additionally, it is a possible to provide in the beam guiding apparatus 6 a focus adjustment apparatus for adjusting the focal position of the second laser beam 5 along the movement direction 10 of the target material 8. For example, two deflection mirrors 15 in the beam path of the second laser beam 5 can be configured to be tiltable, e.g., by a motor or an actuator.

In order to make the focal position F1 of the first laser beam 3 adjustable not only along the movement direction 10 of the target material 8 but also in a direction perpendicular thereto (e.g., Z-direction, cf. FIG. 1A), it is possible to use the telescopic arrangement 34 as a focusing apparatus. In a basic setting, the two lenses 35, 36 of the telescopic arrangement 34 are arranged with the spacing of the focal lengths, such that the collimated first laser beam 3 entering into the telescopic arrangement 34 leaves the telescopic arrangement 34 in a collimated manner (and in a manner magnified by the desired imaging scale), as is depicted in FIG. 1A and FIG. 2A (focal length of the second lens 36: f).

As shown in example, the second lens 36 of the beam telescope 34, which acts as a collimation lens, is displaceable along or counter to the beam direction 37 of the first laser beam 3 by a suitable motor-driven drive. By displacing the collimating lens 36 out of the basic setting shown in FIG. 2A, a divergent beam or a convergent beam can be formed from the collimated first laser beam 3 entering the beam telescope 34. Depending on whether the second lens 36 is displaced along or counter to the beam direction 37 of the first laser beam 3, a divergent or a convergent beam is formed. If the first laser beam 3 enters into the common focusing unit 17 in a divergent or convergent manner, the focal position F1 of the first laser beam 3 changes in the Z-direction, and so the target material 8 at different positions in the Z-direction can be impinged upon by the first laser beam 3.

Figure 2A:
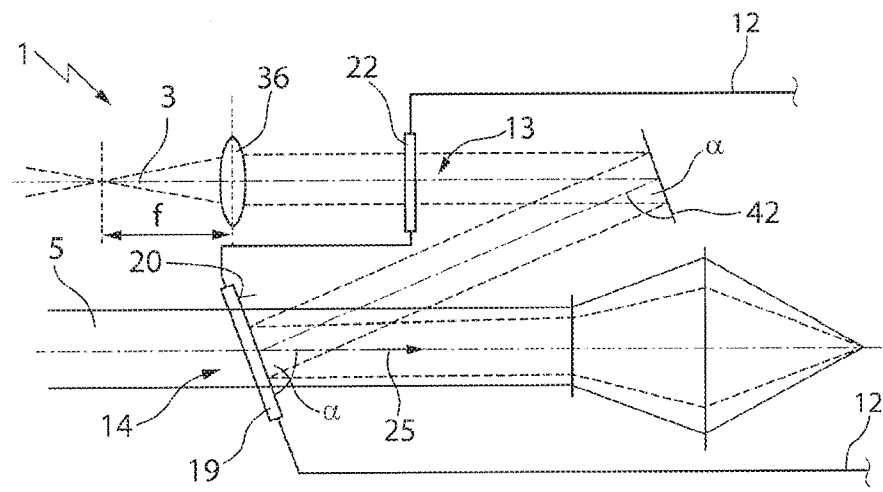
FIG. 2A is a schematic that illustrates a beam path in the vacuum chamber of an exemplary embodiment of an EUV radiation generating device.

As shown in FIG. 2A, the two laser beams 3, 5 are substantially parallel when they enter the vacuum chamber 12. In order to deflect the first laser beam 3 that entered into the vacuum chamber 12 onto the second window 19, a folding mirror 42, which acts as a deflection apparatus, is arranged in the vacuum chamber 12.

In the example shown in FIG. 2A, the second window 19 is aligned at an angle α with respect to the beam direction 25 of the second laser beam 5. The folding mirror 42 is also aligned with respect to the beam direction 25 of the second laser beam 5 at an angle α. In this manner, the first laser beam 3 deflected by the folding mirror 42 is also deflected by the second optical surface 20 of the second window 19 coated with second reflective coating in such a way that the first laser beam 3 and the second laser beam 5 are collinear and are superposed. In the case of a nonparallel entry of the two laser beams 3, 5 into the vacuum chamber 12, the angle at which the folding mirror 42 is aligned with respect to the beam direction of the second laser beam 5 may not correspond to the angle α at which the second window 19 is aligned with respect to the beam direction 25. Arranging the second window 19 at an angle α, which may differ from 90° with respect to the beam direction 25, can allow the use of laser radiation reflected back from the second window 19 (despite an antireflection coating) for measurement purposes. The first window 22 can also be aligned at an angle differing from 90° with respect to the beam direction 33 of the first laser beam 3. This can allow the use of the laser radiation reflected back from the first window 22 for measurement purposes.

Figure 2B:
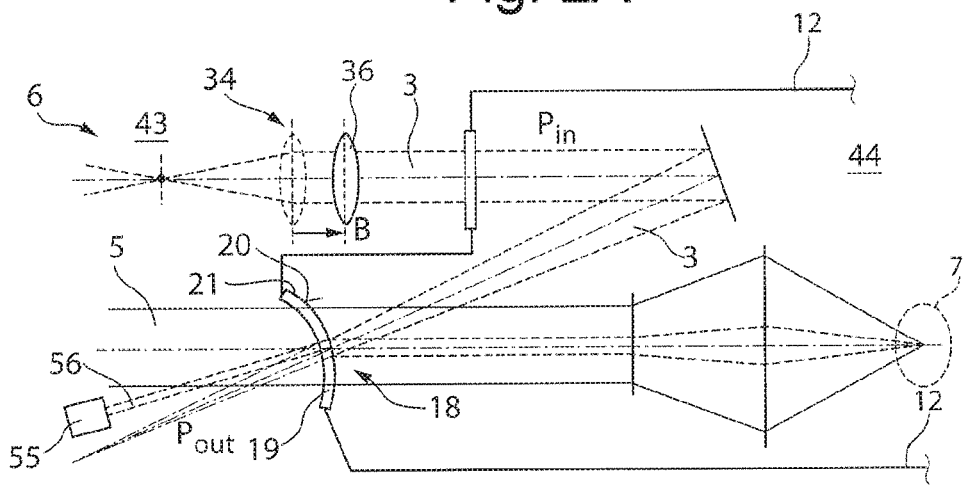
FIG. 2B is a schematic that illustrates a beam path in the vacuum chamber of FIG. 2A, in which a beam expansion caused by a curvature of the window is compensated by a focusing apparatus.

The optical element 19 transmitting the second laser beam 5 is curved (e.g., spherical) in FIG. 2B due to a pressure difference between the surroundings 43 of the vacuum chamber 12 (e.g., a housing) and the interior 44 of the vacuum chamber 12. The second window 19 arches into the interior of the vacuum chamber 12. The first laser beam 3 is reflected at the convexly curved optical surface 20 of the second window 19 and can therefore expand. In order to compensate for a beam expansion of the first laser beam 3 caused by the curvature of the second window 19, the second, collimating lens 36 of the beam telescope in FIG. 2B is displaced out of the basic position depicted in FIG. 2a, in the beam direction of the first laser beam 3.

Figure 2C:
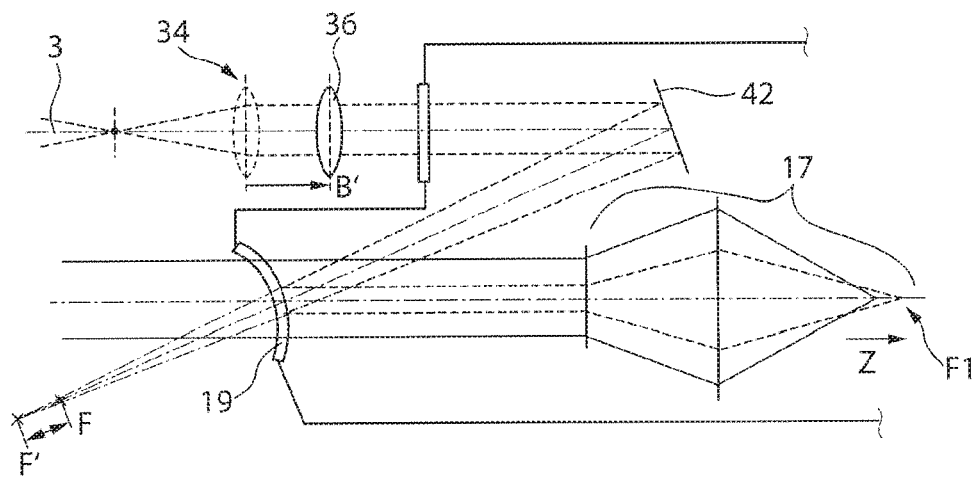
FIG. 2C is a schematic that illustrates a beam path in the vacuum chamber of FIG. 2B, in which the focusing apparatus displaces the focal position of one laser beam in the beam propagation direction relative to the focal position of the other laser beam.

By displacing the second lens 36 arranged in the divergent beam path of the first laser beam 3, the first laser beam 3 can be focused at a (virtual) focus F, shown in FIG. 2C, if there is no or little reflection at the optical surface 20 of the second window 19. In FIG. 2B, the travel B of the second lens 36 from the basic position can be selected in such a way that the focusing effect can compensate the expansion caused by the curvature of the optical surface 20. This can result in the first laser beam 3 being incident in a collimated manner on the focusing unit 17 or on the paraboloid mirror 27.

In order to determine the travel B required for the compensation, the beam guiding apparatus 6 has a measurement apparatus 55 for measuring the curvature of the second window 19. The measurement apparatus 55 can be an optical measurement apparatus that emit measurement radiation 56 onto the window 19 or onto the reflecting optical surface 20 in order to determine the curvature of the window 19. The collimated measurement radiation 56 is reflected back at the second window 19 and the return reflection of the measurement beam is imaged, e.g., by a beam splitter, onto a detector surface that can be provided in the measurement apparatus 55. On the basis of a comparison of the dimensions, e.g. the diameter, of the return reflection and the emitted measurement beam on the detector surface, it is possible to deduce the arching of the second window 19 (e.g., plane, convex, or concave). The ratio of diameters may either be directly related to the travel of the lens 26 needed for the compensation, or the ratio of diameters may be related to the curvature of the window 19. In the latter case, a relation between the curvature of the window 19 and the travel of the lens 26 needs to be known for performing the compensation.

Alternatively or additionally, the measurement apparatus 55 can determine a difference between the pressure $P_{in}$ in the vacuum chamber 12 and the pressure $P_{out}$ outside of the vacuum chamber 12, e.g., in a housing formed there. In this case, the measurement apparatus 55 is typically connected (e.g., to send a signal) with a pressure sensor within the vacuum chamber 12 and/or with a further pressure sensor which is arranged outside of the vacuum chamber 12. On the basis of the measured pressure gradients or on the basis of a parameter dependent on the pressure $P_{in}$ and pressure $P_{out}$ (for example, the pressure difference $P_{out}-P_{in}$ or the ratio between the two pressures $P_{out}/P_{in}$), it may be possible to determine the displacement B required for the compensation. The determination can be based, for example, on a characteristic that relates the parameter to the displacement of the collimation lens 36. It may be possible to displace the second lens 36 by an open-loop and/or closed-loop control apparatus 40 in such a way that the first laser beam 3 is incident on the common focusing unit 17 in a collimated manner. The dependence of the displacement B of the lens 36 required for the compensation on the parameter determined by the measurement apparatus 55 for the pressure gradient can be obtained by experiment or by simulation.

Deviating from FIG. 2B, FIG. 2C is a schematic that illustrates a collimation lens 36 of the telescopic arrangement 34 offset by an amount B' in the beam direction, which deviates from the amount B required for the compensation shown in FIG. 2B. This may result in a displacement of the (virtual) focal position to, for example, focal position F'. By displacing the collimation lens 36 by the amount B in the beam direction, the beam expansion caused by the curvature of the second window 19 can be compensated, as in FIG. 2B. Moreover, there can be a slight beam expansion of the first laser beam 3 reflected at the second window 19, that can lead to a displacement of the focal position F1 of the first laser beam 3 in the Z-direction after passing through the common focusing apparatus 17. The focal position F1 of the first laser beam 3 is displaced in the Z-direction in the target region 7 by approximately the distance between the two virtual focal positions F, F' in FIG. 2B and FIG. 2C, respectively.

For compensating the curvature of the second window 19 and, as an alternative or in addition to the telescopic arrangement 34 in the beam path of the first laser beam 3, a focusing apparatus can be installed in the beam path of the second laser beam 5. For example, the focusing apparatus can include one of the two paraboloid mirrors 16a, 16b. Moreover, the first focusing lens 35 of the beam telescope 34 can be displaced instead of the second collimating lens 36. Optionally, it is also possible to dispense with the option of displacing the two lenses 35, 36. In this case, it can be advantageous if one of the two lenses 35, 36 is arranged in a manner displaced so far out of the basic position shown in FIG. 2A that it just compensates the curvature of the second window 19 present on average or under typical operating conditions.

The open-loop/closed-loop control apparatus or the monitoring apparatus 40 is connected to a drive or actuator 37, indicated by a double-headed arrow, for the purposes of displacing the second lens 36 of the beam telescope 34. This open-loop/closed-loop control apparatus can also be connected (for sending/receiving signals) to the measurement apparatus 55 in order to control or regulate the displacement of the second lens 36 in a manner dependent on the curvature of the second window 19 and the possibly desired displacement of the first focal position F1 in the Z-direction. The open-loop/closed-loop control apparatus 40 is also configured or programmed to influence the beam direction of the first laser beam 3 for a possibly necessary change in the distance A between the two focal positions F1, F2 along the movement direction 10 of the target material 8 and it can be connected (for sending/receiving signals) with actuators actuating the two tiltable deflection mirrors 31, 32. Finally, the open-loop/closed-loop control apparatus 40 is also configured or programmed to synchronize the pulse generation of the two beam sources 2, 4 with the provision apparatus (not shown here) for the target material 8. In this manner, the open-loop/closed-loop control apparatus 40 renders it possible to keep each one of the two laser beams 3, 5 at the focal position F1, F2, respectively, such that the focal positions correspond to a respective setpoint focal position, even in the case of interference in the beam guidance, which is caused, for example, by a change in the curvature of the second window 19.

As an alternative to the above-described superposition of the two laser beams 3, 5 at one of the two windows 19, 22, a superposition of the two laser beams 3, 5 in the vacuum chamber 12 can also be realized in a different manner. For example, the paraboloid mirror 27 can have an inner surface region, at which the second laser beam 5 is reflected, and an outer surface region, surrounding said first surface region in a ring-shaped manner, to reflect the first laser beam 3. By selecting the angles of incidence of the laser beams 3, 5, the beam axes of the two reflecting laser beams 3, 5 can be superposed, e.g., the beam axes extend collinearly after the paraboloid mirror 27 and the two reflected laser beams 3, 5 propagate along a coaxial beam path.

A number of implementations of the invention have been described. Nevertheless, various modifications may be made without departing from the spirit and scope of the invention. Accordingly, other implementations are within the scope of the following claims.

What is claimed is:
1. A beam guiding apparatus, comprising:
a vacuum chamber comprising a target region arranged to receive a target material for generating EUV radiation, wherein the vacuum chamber further includes a first opening for receiving into the vacuum chamber a first laser beam and a second opening for receiving into the vacuum chamber a second laser beam, wherein the first laser beam and the second laser beam have different wavelengths; and
a superposition apparatus arranged to superpose the first and second laser beams entering into the vacuum chamber through the first and second openings, respectively, for common beam guidance in the direction of the target region,
wherein the superposition apparatus comprises at least one of:

a first optical element configured to seal the first opening of the vacuum chamber in a gas-tight manner and transmit the first laser beam, the first optical element comprising a first optical surface arranged in the vacuum chamber and a first coating configured to reflect the second laser beam, or a second optical element configured to seal off the second opening of the vacuum chamber in a gas-tight manner and transmit the second laser beam, the second optical element comprising a second optical surface arranged in the vacuum chamber and a second coating configured to reflect the first laser beam.

2. The beam guiding apparatus of claim 1, wherein the first optical element is a first window which seals off the vacuum chamber in a gas-tight manner, or the second optical element is a second window which seals off the vacuum chamber in a gas-tight manner.

3. The beam guiding apparatus of claim 1, wherein the first optical element is aligned at a first angle with respect to the beam direction of the first laser beam or the second optical element is aligned at a second angle with respect to the beam direction of the second laser beam.

4. The beam guiding apparatus of claim 1, comprising a deflection apparatus, arranged in the vacuum chamber, configured to deflect the first laser beam onto the second optical element or to deflect the second laser beam onto the first optical element.

5. The beam guiding apparatus of claim 1, comprising a focusing apparatus configured to focus the first laser beam and the second laser beam into the target region, wherein the focusing apparatus is arranged in the vacuum chamber downstream of the superposition apparatus.

6. The beam guiding apparatus of claim 1, comprising
a first focusing apparatus, arranged upstream of the superposition apparatus in the beam path of the first laser beam,
a second focusing apparatus arranged upstream of the superposition apparatus in the beam path of the second laser beam, wherein the first focusing apparatus is configured to focus the first laser beam and the second focusing apparatus is configured to focus second laser beam in the direction of the target region.

7. The beam guiding apparatus of claim 6, wherein the first focusing apparatus is configured to compensate a first beam expansion of the first laser beam reflected by a second reflective coating of the second optical element configured as a window, or the second focusing apparatus is configured to compensate a second beam expansion of the second laser beam reflected by a first reflective coating of the first optical element configured as a window.

8. The beam guiding apparatus of claim 6, wherein the first focusing apparatus is configured to change the first focal position of the first laser beam in the beam direction of the first laser beam, and the second focusing apparatus is configured to change the second focal position of the second laser beam in the beam direction of the second laser beam.

9. The beam guiding apparatus of claim 2, further comprising: a measurement apparatus for measuring a curvature of the first optical element configured as a window or for measuring a curvature of the second optical element configured as a window.

10. The beam guiding apparatus of claim 9, wherein the measurement apparatus is configured to determine a pressure inside the vacuum chamber and a pressure outside of the vacuum chamber.

11. The beam guiding apparatus of claim 1, wherein the first optical element has a first antireflection coating for the first laser beam and the second optical element has a second antireflection coating for the second laser beam.

12. The beam guiding apparatus of claim 1, further comprising a focus adjustment apparatus for adjusting at least one of the first focal position of the first laser beam or for adjusting the second focal position of the second laser beam in a movement direction of the target material.

13. The beam guiding apparatus of claim 12, wherein the focus adjustment apparatus is configured to adjust an angle of incidence of the first or second laser beam upon entry into the common focusing apparatus.

14. The beam guiding apparatus of claim 12, further comprising: a closed-loop control apparatus for regulating at least one of the first focal position or the second focal position to a setpoint focal position.

15. The beam guiding apparatus of claim 1, wherein the second laser beam has a wavelength greater than 10 μm.

16. The beam guiding apparatus of claim 1, wherein the first laser beam has a wavelength less than 3 μm.

17. An EUV radiation generating device, comprising:
a first beam source operable to generate a first laser beam;
a second beam source operable to generate a second laser beam, wherein the first laser beam and the second laser beam have different wavelengths; and
a beam guiding apparatus, wherein the beam guiding apparatus comprises:
a vacuum chamber comprising a target region arranged to receive a target material for generating EUV radiation, wherein the vacuum chamber further includes a first opening for receiving into the vacuum chamber the first laser beam and a second opening for receiving into the vacuum chamber the second laser beam, and
a superposition apparatus arranged to superpose the first and second laser beams entering into the vacuum chamber through the first and second openings, respectively, for common beam guidance in the direction of the target region,
wherein the superposition apparatus comprises at least one of:
a first optical element configured to seal the first opening of the vacuum chamber in a gas-tight manner and transmit the first laser beam, the first optical element comprising a first optical surface arranged in the vacuum chamber and a first coating configured to reflect the second laser beam, or
a second optical element configured to seal off the second opening of the vacuum chamber in a gas-tight manner and transmit the second laser beam, the second optical element comprising a second optical surface arranged in the vacuum chamber and a second coating configured to reflect the first laser beam.

18. A beam guiding apparatus, comprising:
a vacuum chamber comprising a target region arranged to receive a target material for generating EUV radiation, wherein the vacuum chamber further includes a first opening for receiving into the vacuum chamber a first laser beam and a second opening for receiving into the vacuum chamber a second laser beam, wherein the first laser beam and the second laser beam have different wavelengths;
a superposition apparatus arranged to superpose the first and second laser beams entering into the vacuum chamber through the first and second openings, respectively, for common beam guidance in the direction of the target region, wherein the superposition apparatus comprises at least one of:
- a first optical element configured to seal the first opening of the vacuum chamber in a gas-tight manner and transmit the first laser beam, wherein the first optical element is a first window which seals off the vacuum chamber in a gas-tight manner, or
- a second optical element configured to seal off the second opening of the vacuum chamber in a gas-tight manner and transmit the second laser beam, wherein the second optical element is a second window which seals off the vacuum chamber in a gas-tight manner; and
- a measurement apparatus for measuring a curvature of the first optical element configured as a window or for measuring a curvature of the second optical element configured as a window.

19. The beam guiding apparatus of claim 18, wherein the measurement apparatus is configured to determine a pressure inside the vacuum chamber and a pressure outside of the vacuum chamber.

* * * * *

UNITED STATES PATENT AND TRADEMARK OFFICE
CERTIFICATE OF CORRECTION

| | |
|---|---|
| PATENT NO. | : 9,596,743 B2 |
| APPLICATION NO. | : 15/067691 |
| DATED | : March 14, 2017 |
| INVENTOR(S) | : Andreas Enzmann |

It is certified that error appears in the above-identified patent and that said Letters Patent is hereby corrected as shown below:

In the Claims

Column 16, Line 56 (approx.), In Claim 18, delete "Abeam" and insert --A beam--.

Signed and Sealed this
Second Day of May, 2017

Michelle K. Lee
*Director of the United States Patent and Trademark Office*